April 1, 1952     W. A. STANITSKI     2,591,631
VEHICLE WHEEL ASSEMBLY

Filed Aug. 25, 1947     2 SHEETS—SHEET 1

Inventor
Walter A. Stanitski

By *Clarence A. O'Brien
and Harvey B. Jacobson*
Attorneys

April 1, 1952  W. A. STANITSKI  2,591,631
VEHICLE WHEEL ASSEMBLY
Filed Aug. 25, 1947  2 SHEETS—SHEET 2
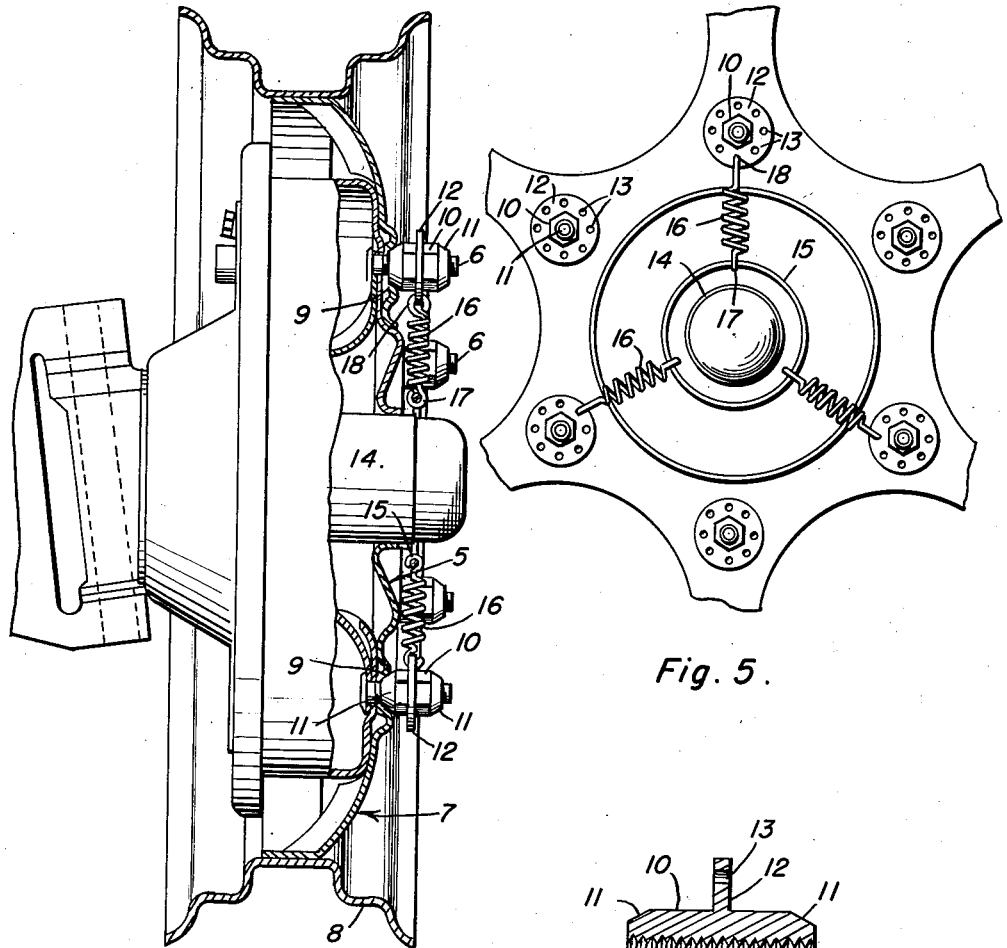
Fig. 5.
Fig. 2.
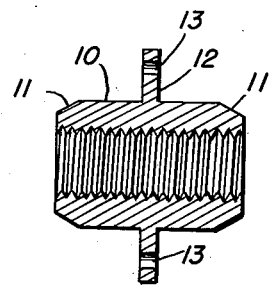
Fig. 4.
Inventor
Walter A. Stanitski
By Clarence A. O'Brien
and Harvey B. Jacobson
Attorneys Patented Apr. 1, 1952

2,591,631

UNITED STATES PATENT OFFICE 2,591,631

VEHICLE WHEEL ASSEMBLY

Walter A. Stanitski, Chester, Pa.

Application August 25, 1947, Serial No. 770,403

3 Claims. (Cl. 301—9)

This invention relates to vehicle wheel assemblies of the type embodying a hub and brake drum assembly carrying a circular series of threaded attaching studs, a demountable rim-carrying part provided with apertures receiving said studs, and nuts threaded on said studs to removably secure the rim-carrying part to the hub and brake drum assembly. More particularly, the present invention relates to a new form of nut for each of the threaded attaching studs, and means to prevent unscrewing of the nuts and separation of the rim-carrying part from the hub and brake drum assembly due to vibration when the wheel assembly is in use.

More specific objects and features of the invention will become apparent from the following description when considered in connection with the accompanying drawings, in which:

Figure 2 is a view partly in elevation and partly in section on line 2—2 of Figure 1;

Figure 4 is a central longitudinal sectional view of the nut shown in Figure 3; and Figure 5 is a fragmentary side elevational view showing a modification.

Figure 1:
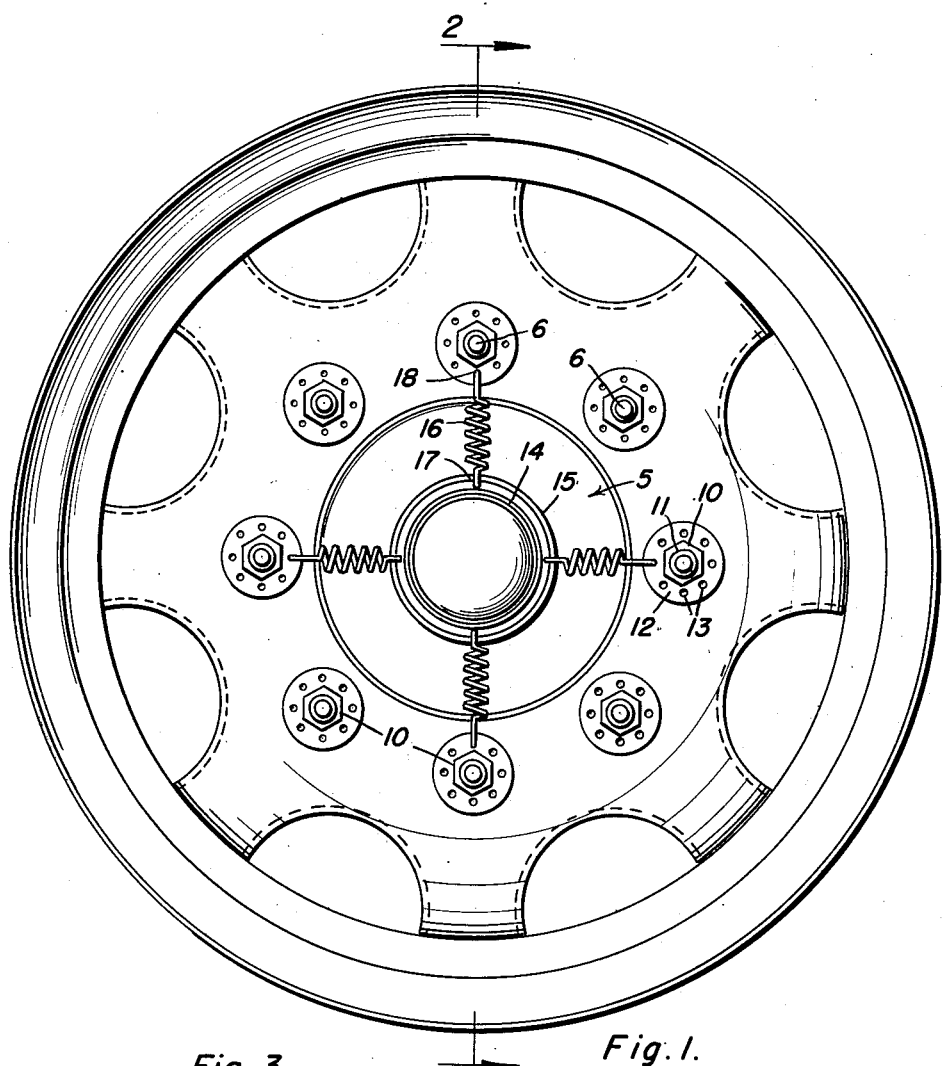
Figure 1 is a side elevational view of a vehicle wheel assembly embodying the present invention.
Figure 3:
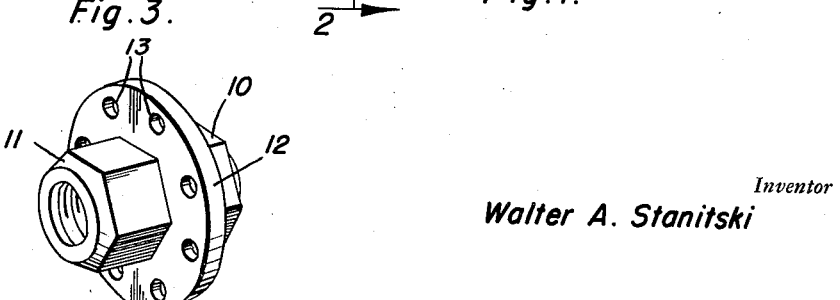
Figure 3 is an enlarged perspective view of one of the nuts forming part of the assembly shown in Figure 1.

Referring in detail to the drawings, 5 indicates a hub and brake drum assembly which carries a circular series of threaded attaching studs 6, and 7 indicates a demountable part carrying a rim 8 and provided with apertures at 9 receiving said studs. Nuts 10 are threaded on said studs to removably secure the rim carrying part 7 to the hub and brake assembly 5.

Thus far described, except for the particular form of the nuts 10, the wheel assembly is of conventional type such as exemplified in the U. S. patent to J. Tjaarda No. 2,133,597, Oct. 18, 1938. In accordance with the present invention, the nuts 10 are double-ended, in that both ends of each nut are tapered, as at 11, for wedging into the holes 9, regardless of which end of the nut is started onto the stud first. This eliminates the necessity of carefully selecting the proper end of the nut to be started onto the stud first, as is necessary with a single-ended nut having only one tapered end. Each nut 10 is formed intermediate its ends with an integral projecting annular flange 12 provided with a circular series of uniformly spaced apertures 13, for a purpose which will presently become apparent.

Disposed in adjacent surrounding relation to the hub proper 14 of the assembly 5 is a circular ring 15 preferably formed of stiff wire and disposed inwardly of the studs 6. The ring 15 is connected to all or certain uniformly spaced ones of the nuts 10 by means of helical tension spring 16, so as to prevent unscrewing of the nuts due to vibration when the wheel assembly is in use. As shown, each spring 16 is provided at its inner end with an eye 17 that embraces the ring 15 so as to attach said inner end of the spring to said ring. At the other or outer end, each spring 16 is formed with a hook 18 detachably engaged in the aperture of the flange 12 of the nut 10 radially aligned with the spring. A sufficient number of the nuts are held against unscrewing in this manner to insure against accidental separation of the part 7 from the assembly 5. When there are eight attaching studs as in Figure 1, four springs are preferably employed as shown in Figure 1, so that a spring is connected to each of alternate ones of the nuts. When there are six threaded studs, as in Figure 5, three springs may be employed to engage alternate nuts, as shown in Figure 5. However, it is obvious that additional springs may be employed so that all of the nuts may be held against accidental unscrewing. By providing a series of the apertures 13, one of said apertures will be positioned in radial alignment with the associated spring when the nut is tightened, regardless of the particular stud onto which the nut is threaded.

In practice, the outer ends of the springs 16 are disengaged from the nut flanges 12 and the nuts are unscrewed to permit dismounting of the rim-carrying part 7. To remount the rim-carrying part 7, the latter is placed on the studs 6, the nuts are then threaded on said studs, and then the outer ends of the springs 16 are engaged in the proper apertures of the flanges 12 of the nuts radially aligned therewith. Of course, the ring 15 is disposed over the hub proper 14 before connecting the outer ends of the springs 16 to the nuts.

From the foregoing description, it will be seen that I have provided a simple and efficient means for preventing unscrewing of the nuts due to vibration when the wheel assembly is in use. Modifications and minor changes in details of construction are contemplated, such as fall within the scope of the invention as claimed.

Having described the invention, what is claimed as new is:

1. The combination with a disk-type vehicle wheel embodying a hub and brake drum assembly having a circular series of threaded attaching studs fixed thereto in spaced surrounding relation to the hub, a demountable rim-carrying disk provided with apertures receiving said studs, and nuts threaded on said studs to removably secure the rim-carrying disk to the hub and brake drum assembly, each of said nuts having a projecting annular flange provided with a circular series of uniformly spaced apertures, an annular ring spaced from and encircling the hub proper of the hub and brake drum assembly inwardly of the studs, and radial members carried by said ring and having hooks on their outer ends detachably engaged in apertures of the flanges of certain of said nuts to prevent unscrewing of the latter due to vibration or the like.

2. The construction defined in claim 1, wherein each of said radial members comprises a helical tension spring having an eye at its inner end embracing the ring.

3. The construction defined in claim 1, wherein each of said nuts is provided at both ends with tapered portions to wedge in the apertures of the rim-carrying disk regardless of which end of the nut is threaded onto the stud first, and wherein said projecting annular flange is provided on the nut intermediate the ends thereof.

WALTER A. STANITSKI.

REFERENCES CITED

The following references are of record in the file of this patent:

UNITED STATES PATENTS

| Number | Name | Date |
| --- | --- | --- |
| 47,613 | Bolles | May 9, 1865 |
| 95,897 | Griswold | Oct. 19, 1869 |
| 930,148 | Brown | Aug. 3, 1909 |
| 1,281,890 | Alguire | Oct. 15, 1918 |
| 1,376,336 | Howard | Apr. 26, 1921 |
| 1,997,821 | Gzupkaytie | Apr. 16, 1935 |
| 2,133,597 | Tjaarda | Oct. 18, 1938 |
| 2,280,584 | Horn | Apr. 21, 1942 |

FOREIGN PATENTS

| Number | Country | Date |
| --- | --- | --- |
| 564,228 | Great Britain | Sept. 19, 1944 |
| 672,705 | Germany | Feb. 16, 1939 |